US009509820B2

(12) United States Patent
Gopinath

(10) Patent No.: US 9,509,820 B2
(45) Date of Patent: Nov. 29, 2016

(54) METHODS AND SYSTEMS FOR CONTROLLING IN-VEHICLE SPEAKERS

(71) Applicant: Harman International Industries, Incorporated, Stamford, CT (US)

(72) Inventor: Sreejit Gopinath, Kayamkulam (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/559,794

(22) Filed: Dec. 3, 2014

(65) Prior Publication Data

US 2016/0165031 A1 Jun. 9, 2016

(51) Int. Cl.
| H04W 4/04 | (2009.01) |
| H04M 1/60 | (2006.01) |
| H04W 24/02 | (2009.01) |
| H04W 8/00 | (2009.01) |
| H04W 12/06 | (2009.01) |
| H04W 4/00 | (2009.01) |

(52) U.S. Cl.
CPC ............ *H04M 1/6091* (2013.01); *H04W 4/008* (2013.01); *H04W 4/046* (2013.01); *H04W 8/005* (2013.01); *H04W 12/06* (2013.01)

(58) Field of Classification Search
USPC ............ 455/41.1, 456.1, 456.3, 569.1, 569.2
See application file for complete search history.

(56) References Cited

U.S. PATENT DOCUMENTS

| 7,233,661 B2* | 6/2007 | Palett | ......................... B60R 1/12 |
| | | | 379/446 |
| 2015/0256668 A1* | 9/2015 | Atkinson | ............ H04M 1/6075 |
| | | | 455/418 |

* cited by examiner

*Primary Examiner* — Blane J Jackson
(74) *Attorney, Agent, or Firm* — Alleman Hall McCoy Russell & Tuttle LLP

(57) ABSTRACT

Embodiments are disclosed for an in-vehicle computing system for selectively adjusting audio settings for speakers in a vehicle. In some embodiments, an in-vehicle computing system for a vehicle includes a processor, an external device interface communicatively coupleable to a mobile device, and a storage device storing instructions executable by the processor to receive an indication of an incoming call directed toward the mobile device. The instructions are further executable to determine location information for the mobile device, correlate the mobile device with a selected speaker of the vehicle, the selected speaker being associated with the location information for the mobile device, and adjust, via the in-vehicle computing system, at least one audio setting for the selected speaker.

15 Claims, 8 Drawing Sheets

METHODS AND SYSTEMS FOR CONTROLLING IN-VEHICLE SPEAKERS

FIELD

The disclosure relates to controlling vehicle systems including in-vehicle speakers.

BACKGROUND

Drivers and passengers may carry a mobile device into a vehicle and/or otherwise be reachable by phone while occupying the vehicle. While phone calls may be directed to one driver or passenger, the vehicle may also output audio from one or more speakers that are located in different positions in the vehicle to provide audible sound to multiple occupants of the vehicle.

SUMMARY

In some vehicle systems, speakers may be located in positions corresponding to locations of occupants in the vehicle. In examples where a selected occupant receives a phone call while audio is being played back via a speaker corresponding to the location of the occupant, the audio output from that speaker may affect the ability of the occupant to listen to and participate in the received call. Embodiments are disclosed for selectively altering a volume level of in-vehicle speakers based on one or more factors, such as a context of occupant devices and/or occupants in the vehicle.

In some embodiments, an in-vehicle computing system includes a processor, an external device interface communicatively coupleable to a mobile device, and a storage device storing instructions executable by the processor to receive an indication of an incoming call directed toward the mobile device. The instructions may be further executable to determine location information for the mobile device, correlate the mobile device with a selected speaker of the vehicle, the selected speaker being associated with the location information for the mobile device, and adjust, via the in-vehicle computing system, at least one audio setting for the selected speaker.

In some embodiments, a mobile device for interacting with an in-vehicle computing system includes a display, a communication interface comprising an antenna operable to receive information according to a location-dependent communication protocol, a processor, and a storage device storing instructions executable by the processor to exchange one or more of authentication information and an identifier of the mobile device with an in-vehicle computing system. The instructions may further be executable to receive location information from a location sensor in a vehicle via the antenna, send the location information to the in-vehicle computing system, receive an indication of an incoming call, and selectively accept the call based on user input to the mobile device.

According to some embodiments, a method includes selectively adjusting audio settings for speakers in a vehicle via an in-vehicle computing system. For example, the method may include outputting audio content via one or more speakers in the vehicle, detecting a mobile device in the vehicle, and determining a location of the mobile device. The method may further include determining that an incoming communication is directed toward the mobile device, and, for more than one speaker in the vehicle, selectively adjusting one or more audio settings of that speaker in the vehicle based on a proximity of that speaker to the location of the mobile device.

BRIEF DESCRIPTION OF THE DRAWINGS

The disclosure may be better understood from reading the following description of non-limiting embodiments, with reference to the attached drawings, wherein below.

DETAILED DESCRIPTION

As described above, occupants of a vehicle may have mobile devices that are able to receive incoming communications, such as phone calls. If a call comes into a mobile device, any audio being played back in the vehicle may be distracting to the user of the mobile device by reducing the user's ability to hear the communication and/or by reducing the ability of the other party (e.g., the calling party) to distinguish the user from the in-vehicle audio. In scenarios where the user of the mobile device receiving the call is a passenger, the driver may not be able to determine that the user is attempting to conduct a call. Even if the driver is made aware of the ongoing call, the drive would then have to pull attention from operating the vehicle in order to manually lower the volume of all speakers in the vehicle. Such an action may be frustrating to other occupants of the vehicle, as the one user's phone call results in a reduced audio experience for all other occupants.

In order to address the above-described scenarios to reduce occupant frustration, the present disclosure provides methods and systems for automatically adjusting audio settings for speakers (e.g., in a vehicle) based on a location of a mobile device that is receiving an incoming call or other communication/notification. By detecting a location of the mobile device and automatically adjusting operation of a speaker near that mobile device, the distractions to the user of the mobile device (and the driver) may be reduced and the audio experience of other occupants of the vehicle may be largely unchanged while the communication is occurring.

Figure 1:
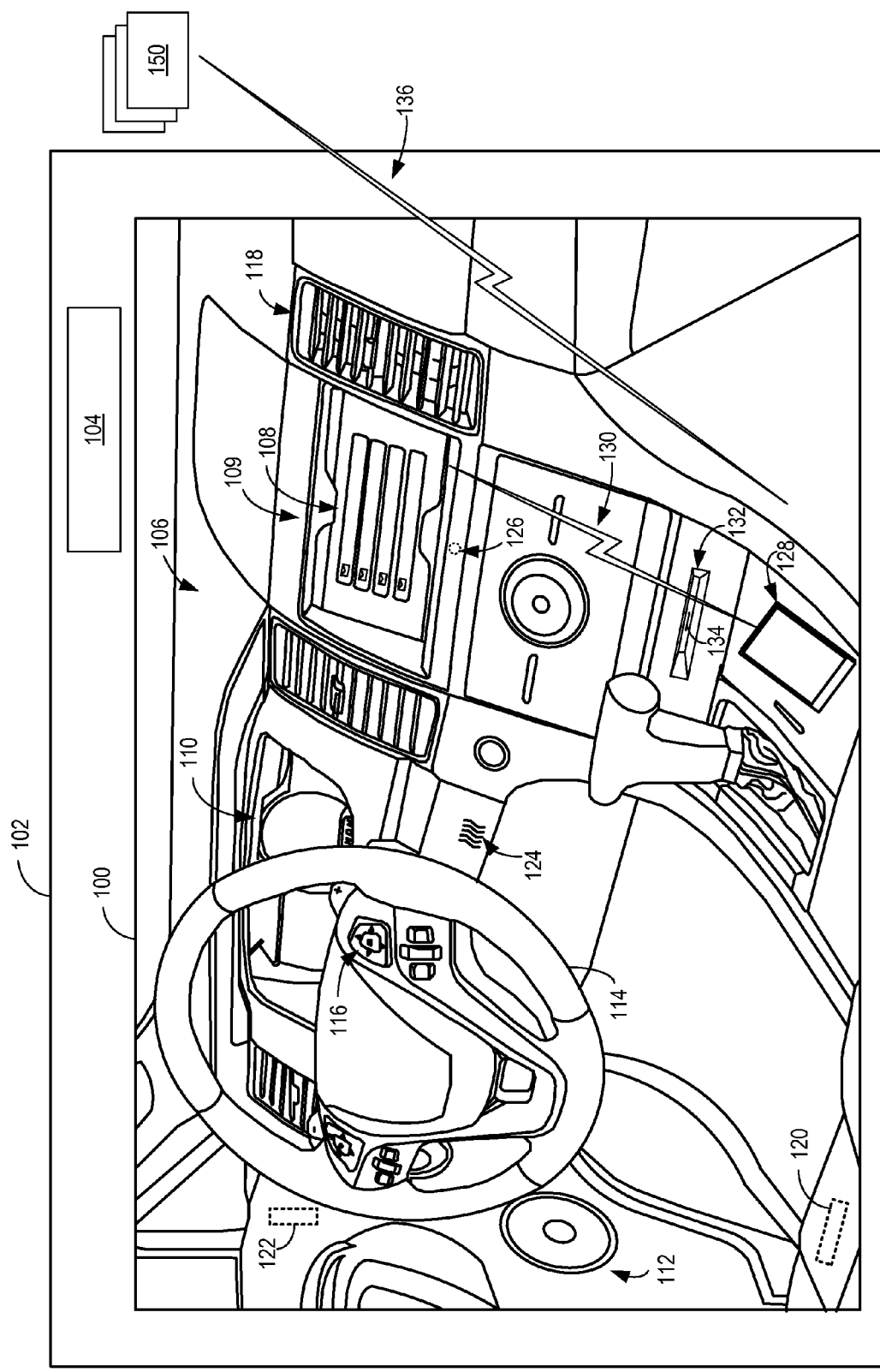
FIG. 1 shows an example partial view of a vehicle cabin in accordance with one or more embodiments of the present disclosure.

FIG. 1 shows an example partial view of one type of environment: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated and/or accessed by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In the example environment illustrated in FIG. 1, the in-vehicle computing system 109 may be connected to one or more vehicle systems, such as speakers 112, display 108, vehicle sensors, and/or other suitable vehicle systems via any suitable network. In some examples, the in-vehicle computing system 109 includes a talker device configured to transmit audio/video data to listener devices, such as speakers 112 and display 108 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talkers and the listeners may be configured to communicate over the AVB network using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 related to a possible data streaming format. Other AVB-related standards and protocols, and/or other versions of the AVB standards and protocols, previously, currently, or later developed, may also or alternatively be used.

The in-vehicle computing system may stream audio/video data based on information stored in local storage, audio/video data received from mobile device 128 and/or external device(s) 150, audio/video data received over the air (e.g., from a radio broadcasting station), etc. One or more of the speakers 112 of the vehicle may be independently controlled from the other speakers of the vehicle, such that a volume, equalization, and/or other audio setting may be set for each speaker (e.g., automatically and/or via user input to the in-vehicle computing system 109).

It is to be understood that FIG. 1 depicts one example environment, however the systems and methods described herein may be utilized in any suitable environment. As another example, speakers in a home audio environment, a recording studio, and/or other suitable environment may be selectively controlled based on a context of devices and/or users in the environment.

Figure 2:
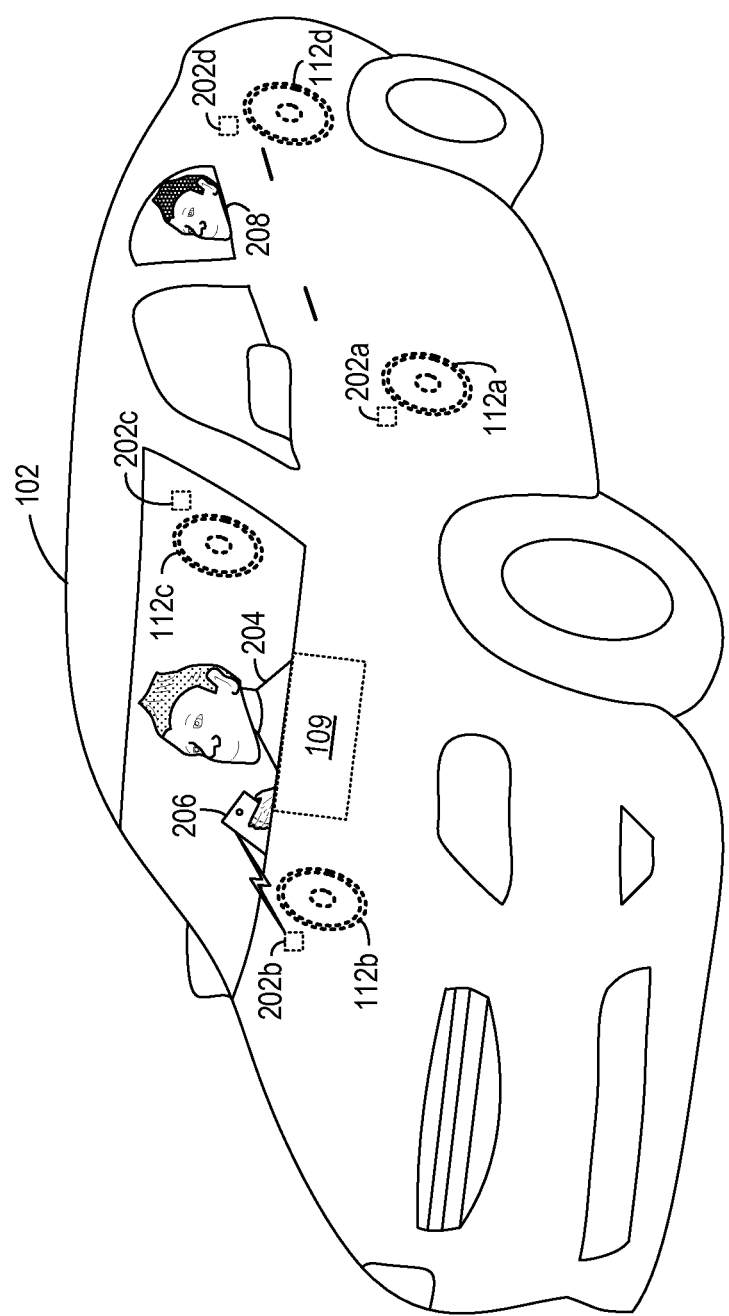
FIG. 2 shows an example vehicle including differentially-positioned speakers and location sensors in accordance with one or more embodiments of the present disclosure.

FIG. 2 illustrates an example arrangement of differentially-located speakers 112a-d within vehicle 102 of FIG. 1. Each speaker may correspond to a potential location of an occupant of the vehicle (e.g., a seat in the vehicle). For example, speaker 112a may correspond to a driver position, speaker 112b may correspond to a front passenger position, speaker 112c may correspond to a right rear passenger position, and speaker 112d may correspond to a left rear passenger position. It is to be understood that the number and arrangement of speakers in FIG. 2 is exemplary in nature and additional or alternative numbers and arrangements of speakers may be included in the vehicle in some examples.

As illustrated, location sensors 202a-d may be positioned in locations corresponding to the locations of speakers 112a-d. Each location sensor may comprise one or more wireless transmitters and/or receivers and may be configured to store an indication of the location of that sensor. For example, the location sensors may include memory (e.g., a hardware storage device) that stores an absolute location (e.g., GPS coordinates), a location relative to the vehicle (e.g., "left rear passenger side"), a location relative to a speaker (e.g., "left rear speaker"), a unique identifier for the sensor, and/or any other suitable indication of the sensor and/or sensor location. The wireless transmitter(s) and/or receiver(s) of the location sensors 202a-d may communicate via any suitable communication protocol, including but not limited to location-dependent protocols such as near-field communication (NFC) and/or ZIGBEE (e.g., as defined in the IEEE 802.15 standard). In additional or alternative embodiments, location sensors 202a-d may include radio-frequency identification (RFID) tags or systems. In this way, the location sensors may actively or passively transmit location information (e.g., broadcast location information, transmit location information responsive to a request or other suitable trigger, etc.) to other devices within range of the location sensors (e.g., in-vehicle computing system 109, mobile devices of occupants of the vehicle, etc.). It is to be understood that in some embodiments location sensors 202*a-d* may additionally or alternatively be communicatively connected to one or more other devices (e.g., in-vehicle computing system 109) via a wired connection (e.g., Ethernet).

In the example of FIG. 2, a first user 204 may be sitting in a front passenger seat and may be proximate to an associated mobile device 206 (e.g., a smartphone). The mobile device 206 may connect to in-vehicle computing system 109 (e.g., upon entering the vehicle) such that incoming communication (e.g., phone calls) to the mobile device are handled by the in-vehicle computing system 109 and/or are recognizable by the in-vehicle computing system. For example, mobile device 206 may register with in-vehicle computing system 109 and allow the in-vehicle computing system to accept/intercept incoming calls directed to mobile device 206 and selectively route the incoming calls to the mobile device. In this way, in-vehicle computing system 109 may be informed of the status of mobile device 206 may make adjustments to other vehicle systems accordingly. For example, if mobile device 206 receives a phone call, the mobile device may attempt to acquire the present location of the mobile device by communicating with a nearest location sensor (e.g., sensor 202*b* in the illustrated example). In additional or alternative examples, the mobile device may determine the location as soon as it is in range of a location sensor, such that the location is always updated as the mobile device moves into range of a different location sensor. In either case, the mobile device 206 may transmit an indication of the location of the mobile device to the in-vehicle computing system responsive to the incoming phone call. For example, the mobile device 206 may transmit a location stored at location sensor 202*b* and/or an identifier of sensor 202*b* to in-vehicle computing system 109.

The in-vehicle computing system 109 may correlate the location indicator (e.g., the location data and/or sensor identifier received from the mobile device) to one or more speakers of the vehicle. For example, the location data and/or sensor identifier for sensor 202*b* may be associated with speaker 112 (e.g., in a look up table or other suitable mechanism of the in-vehicle computing system). In this way, the in-vehicle computing system 109 may determine that the incoming call is directed to a device in proximity to speaker 112*b*. In response to the incoming call and/or responsive to a user (e.g., user 204) accepting the call and interacting with mobile device 206, the in-vehicle computing system 109 may adjust one or more audio settings of speaker 112*b* and/or speakers 112*a*, 112*c*, and 112*d*. For example, the in-vehicle computing system 109 may lower a volume of speaker 112*b* in order to enable user 204 to conduct the phone call with reduced distraction from audio output by the nearest speaker. Other examples of speaker adjustments are described below with respect to FIG. 6B. By adjusting the operation of speaker 112*b* differently from speakers 112*a*, 112*c*, and 112*d* based on the proximity of speaker 112*b* to mobile device 206, the audio system of vehicle 102 may maintain audio content delivery to other occupants of the vehicle (e.g., user 208 in the left rear passenger seat) while reducing distractions for the user of the mobile device.

Figure 3:
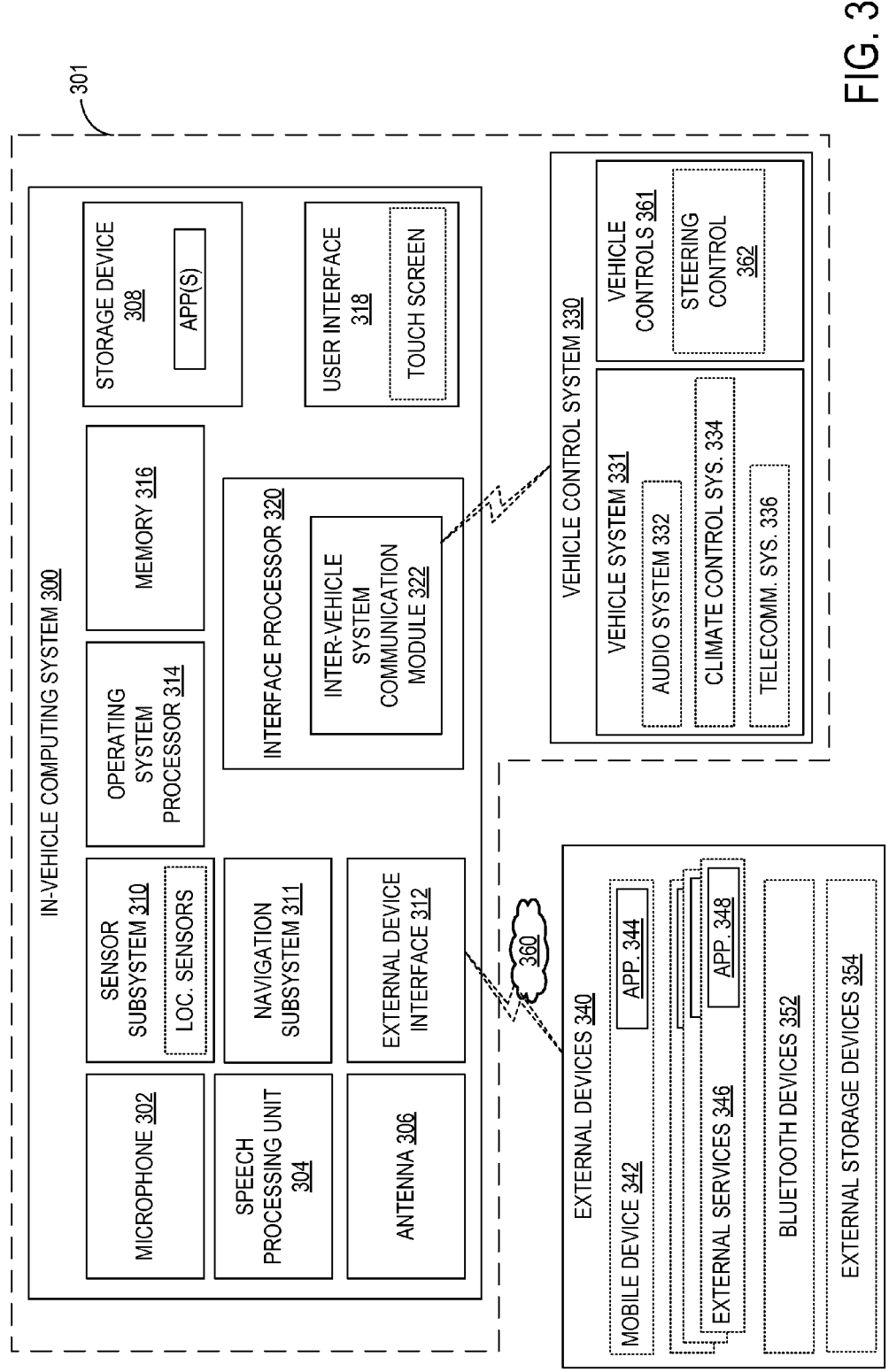
FIG. 3 shows a block diagram of an in-vehicle computing system in accordance with one or more embodiments of the present disclosure.

FIG. 3 shows a block diagram of an in-vehicle computing system 300 configured and/or integrated inside vehicle 301. In-vehicle computing system 300 may be an example of in-vehicle computing system 109 of FIG. 1 and/or include one or more modules/elements of the vehicle 102 of FIG. 2 in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 301 in order to enhance an in-vehicle experience for a driver and/or a passenger.

In-vehicle computing system 300 may include one or more processors including an operating system processor 314 and an interface processor 320. Operating system processor 314 may execute an operating system on the in-vehicle computing system, and control input/output, display, playback, and other operations of the in-vehicle computing system. Interface processor 320 may interface with a vehicle control system 330 via an inter-vehicle system communication module 322.

Inter-vehicle system communication module 322 may output data to other vehicle systems 331 and vehicle control elements 361, while also receiving data input from other vehicle components and systems 331, 361, e.g. by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 308 may be included in in-vehicle computing system 300 to store data such as instructions executable by processors 314 and 320 in non-volatile form. The storage device 308 may store application data to enable the in-vehicle computing system 300 to run an application for connecting to a cloud-based server and/or collecting information for transmission to the cloud-based server. The application may retrieve information gathered by vehicle systems/sensors, input devices (e.g., user interface 318), devices in communication with the in-vehicle computing system (e.g., a mobile device connected via a Bluetooth link), etc. In-vehicle computing system 300 may further include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 320), controls the in-vehicle computing system 300 to perform one or more of the actions described in the disclosure. For example, the method(s) and/or other actions described in the disclosure are performed by the above-described instructions and/or code in combination with one or more systems and/or structures described in the disclosure (e.g., speaker(s) of the vehicle, mobile device(s) within the vehicle, position sensor(s) in the vehicle, and/or structures of the in-vehicle computing system such as antenna(s), user interface(s)/display(s), external device interface(s), etc.).

A microphone 302 may be included in the in-vehicle computing system 300 to receive voice commands from a user, to measure ambient noise in the vehicle, to determine whether audio from speakers of the vehicle is tuned in accordance with an acoustic environment of the vehicle, etc. A speech processing unit 304 may process voice commands, such as the voice commands received from the microphone 302. In some embodiments, in-vehicle computing system 300 may also be able to receive voice commands and sample ambient vehicle noise using a microphone included in an audio system 332 of the vehicle.

One or more additional sensors may be included in a sensor subsystem 310 of the in-vehicle computing system 300. For example, the sensor subsystem 310 may include one or more location sensors, such as location sensors 202a-d of FIG. 2. Sensor subsystem 310 may additionally or alternatively include one or more cameras or other image sensors, such as a rear view camera for assisting a user in parking the vehicle and/or a cabin camera for identifying a user (e.g., using facial recognition and/or user gestures). Sensor subsystem 310 of in-vehicle computing system 300 may communicate with and receive inputs from various vehicle sensors and may further receive user inputs. For example, the inputs received by sensor subsystem 310 may include locations and/or identifiers from location sensors, pressure measurements from pressure sensors (e.g., in seats of the vehicle), transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 311 of in-vehicle computing system 300 may generate and/or receive navigation information such as location information (e.g., via a GPS sensor and/or other sensors from sensor subsystem 310), route guidance, traffic information, road construction/detour information, point-of-interest (POI) identification, and/or provide other navigational services for the driver.

External device interface 312 of in-vehicle computing system 300 may be coupleable to and/or communicate with one or more external devices 340 located external to vehicle 301. While the external devices are illustrated as being located external to vehicle 301, it is to be understood that they may be temporarily housed in vehicle 301, such as when the user is operating the external devices while operating vehicle 301. In other words, the external devices 340 are not integral to vehicle 301. The external devices 340 may include a mobile device 342 (e.g., connected via a Bluetooth connection) or an alternate Bluetooth-enabled device 352. Mobile device 342 may be a mobile phone, smart phone, wearable devices/sensors that may communicate with the in-vehicle computing system via wired and/or wireless communication, or other portable electronic device(s). For example, mobile device 342 may include mobile device 128 of FIG. 1 and/or mobile device 206 of FIG. 2. Other external devices include external services 346. For example, the external devices may include extra-vehicular devices that are separate from and located externally to the vehicle. Still other external devices include external storage devices 354, such as solid-state drives, pen drives, USB drives, etc. External devices 340 may communicate with in-vehicle computing system 300 either wirelessly or via connectors without departing from the scope of this disclosure. For example, external devices 340 may communicate with in-vehicle computing system 300 through the external device interface 312 over network 360, a universal serial bus (USB) connection, a direct wired connection, a direct wireless connection, and/or other communication link. The external device interface 312 may provide a communication interface to enable the in-vehicle computing system to communicate with mobile devices associated with contacts of the driver. For example, the external device interface 312 may enable phone calls to be established and/or text messages (e.g., SMS, MMS, etc.) to be sent (e.g., via a cellular communications network) to a mobile device associated with an occupant of the vehicle (e.g., mobile device 206 of FIG. 2).

One or more applications 344 may be operable on mobile device 342. Applications 344 may include instructions stored on a storage device of mobile device 342 and executable by a processor of mobile device 342. As an example, mobile device application 344 may be operated to aggregate user data regarding interactions of the user with the mobile device. For example, mobile device application 344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 344 to external device interface 312 over network 360. In addition, specific user data requests may be received at mobile device 342 from in-vehicle computing system 300 via the external device interface 312. The specific data requests may include requests for determining where the user is geographically located, an ambient noise level and/or music genre at the user's location, an ambient weather condition (temperature, humidity, etc.) at the user's location, etc. Mobile device application 344 may send control instructions to components (e.g., microphone, etc.) or other applications (e.g., navigational applications) of mobile device 342 to enable the requested data to be collected on the mobile device. Mobile device application 344 may then relay the collected information back to in-vehicle computing system 300. In some examples, mobile device application 344 may be executed to collect, analyze/process, and/or transmit location information, device status information for the mobile device, and/or any other suitable information. The collected and/or analyzed/processed information may be sent to external services 346 and/or in-vehicle computing system 300. For example, mobile device application 344 may be configured to gather location information from location sensors in the vehicle, then transmit the location information to the in-vehicle computing system. In some examples, the location information may be transmitted continuously, while in other examples, the location information may be transmitted periodically (e.g., at regular intervals) and/or responsive to a trigger (e.g., a change in location information, a request from in-vehicle computing system and/or a user, a detection of an event such as an incoming phone call or change in device status, etc.). The mobile device application 344 may additionally or alternatively be executed to perform a handshake and/or authentication routine between in-vehicle computing system 300 and mobile device 342. Upon performing the handshake and/or authentication routine, the in-vehicle computing system may intercept incoming calls to the mobile device, pass incoming calls to the mobile device, and/or determine a status of the mobile device (e.g., whether a call is taking place via the mobile device).

Likewise, one or more applications 348 may be operable on external services 346. As an example, external services applications 348 may be operated to aggregate and/or analyze data from multiple data sources. For example, external services applications 348 may aggregate data from one or more social media accounts of the user, data from the in-vehicle computing system (e.g., sensor data, log files, user input, etc.), data from an internet query (e.g., weather data, POI data), etc. The collected data may be transmitted to another device (e.g., a mobile device) and/or analyzed by the application.

Vehicle control system 330 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others.

Audio system 332 may include one or more acoustic reproduction devices including electromagnetic transducers such as speakers. Vehicle audio system 332 may be passive or active such as by including a power amplifier. In some examples, in-vehicle computing system 300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies. Audio system 332 may be controlled by one or more of the interface processor 320 of the in-vehicle computing system and one or more external devices 340 (e.g., mobile device 342). For example, based on a status of mobile device 342, the mobile device and/or the in-vehicle computing system may control the speakers of audio system 332 to adjust a volume, equalization, and/or other audio setting based on the status of the mobile device.

Climate control system 334 may be configured to provide a comfortable environment within the cabin or passenger compartment of vehicle 301. Climate control system 334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 330 may also include controls for adjusting the settings of various vehicle controls 361 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/ clutch pedals, a gear shift, door/window controls positioned in a driver or passenger door, seat controls, cabin light controls, audio system controls, cabin temperature controls, etc. The control signals may also control audio output at one or more speakers of the vehicle's audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 334. For example, the control signals may increase delivery of cooled air to a specific section of the cabin.

Control elements positioned on an outside of a vehicle (e.g., controls for a security system) may also be connected to computing system 300, such as via communication module 322. The control elements of the vehicle control system may be physically and permanently positioned on and/or in the vehicle for receiving user input. In addition to receiving control instructions from in-vehicle computing system 300, vehicle control system 330 may also receive input from one or more external devices 340 operated by the user, such as from mobile device 342. This allows aspects of vehicle systems 331 and vehicle controls 361 to be controlled based on user input received from the external devices 340.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna(s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 300 and mobile device 342 via user interface 318. In addition to receiving a user's vehicle setting preferences on user interface 318, vehicle settings selected by in-vehicle control system may be displayed to a user on user interface 318. Notifications and other messages (e.g., received messages/incoming call information), as well as navigational assistance, may be displayed to the user on a display of the user interface. User preferences/information and/or responses to presented messages may be performed via user input to the user interface.

Figure 4:
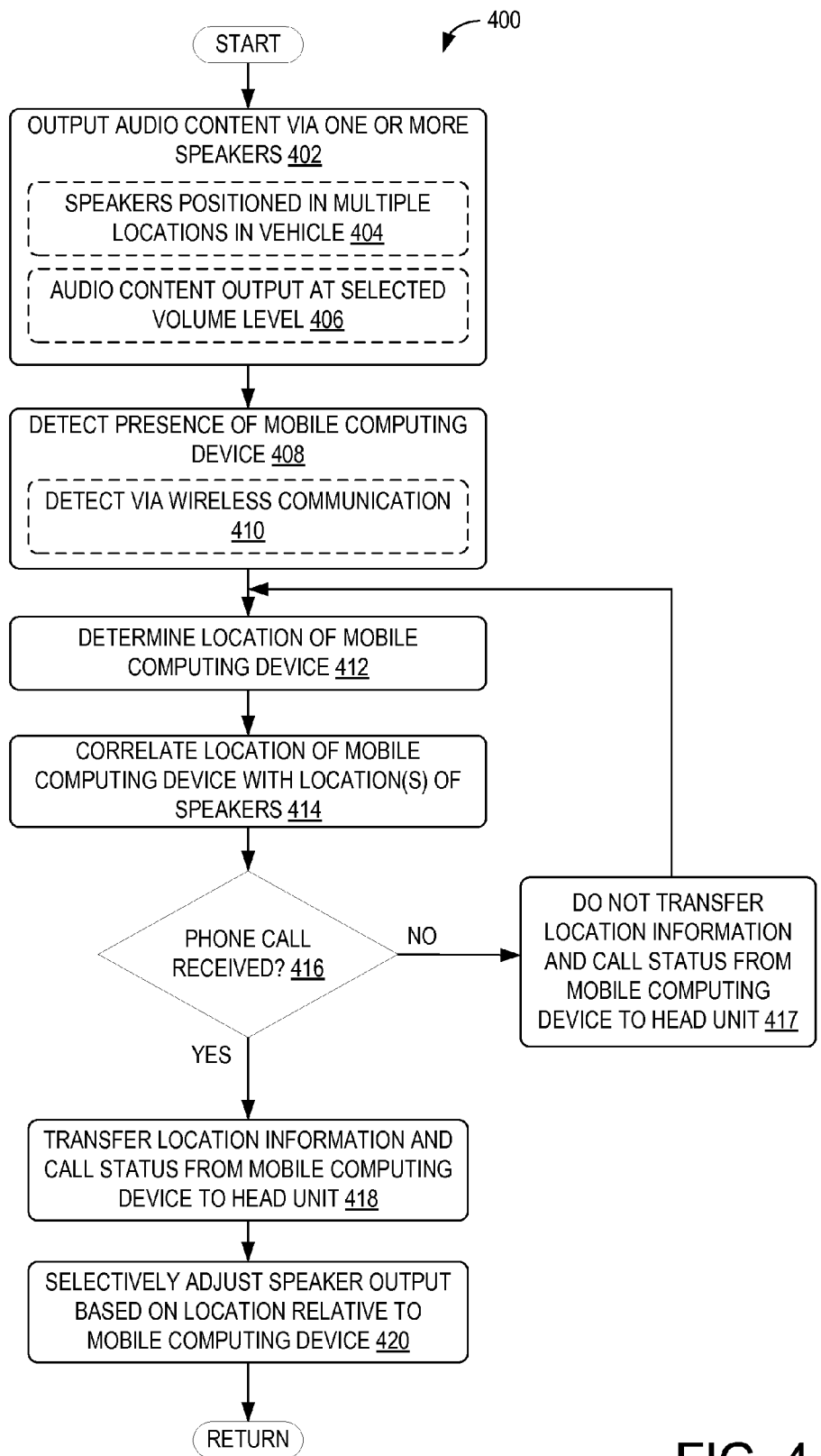
FIG. 4 is a flow chart for an example method of selectively adjusting speaker output characteristics in accordance with one or more embodiments of the present disclosure.

FIG. 4 is a flow chart of a method 400 for selectively adjusting speaker operation based on a context of a mobile device in the vehicle. For example, method 400 may be performed by one or more of in-vehicle computing system 109 of FIGS. 1 and 2, mobile device 128 of FIG. 1, and mobile device 206 of FIG. 2. At 402, method 400 includes outputting audio content via one or more speakers. As indicated at 404, the speakers may be positioned in multiple locations in a vehicle (e.g., in multiple locations relative to seats of the vehicle, as described above with respect to FIG. 2). The content may be output at each speaker at a selected volume level (e.g., a predetermined and/or user-selected volume level), as indicated at 406. In some embodiments, the volume level of each speaker may be the same. In other embodiments, the volume level of each or some of the speakers may be different from one another.

At 408, method 400 includes detecting the presence of a mobile computing device. For example, as indicated at 410, the mobile computing device may be detected (e.g., by an in-vehicle computing system) via wireless communication. At 412, method 400 includes determining a location of the mobile computing device. For example, the mobile computing device may receive location information from a sensor via location-dependent wireless communication (e.g., RFID, NFC sensor, ZIGBEE sensor, etc.) and transmit the location information to the in-vehicle computing device. At 414, method 400 includes correlating the location of the mobile computing device with the location(s) of one or more speakers. For example, the in-vehicle computing device may include a look-up table or similar mechanism associating location information that may be acquired by the mobile device to each speaker in the vehicle. In the example described above in which the mobile computing device receives location information from a sensor, each speaker may be correlated to a nearest sensor and/or ranked to indicate a relative total distance to each sensor. By correlating the location of the mobile computing device with the location of the speakers in the vehicle, the in-vehicle computing system may determine which speaker is closest to the mobile computing device.

As indicated at 416, method 400 includes determining if a phone call is received at the mobile computing device. It is to be understood that the method may additionally or alternatively include determining if other events are received and/or occur at the mobile device, such as an SMS/MMS message, email, video call, and/or other communication, notification, and/or alert. In some examples, the communication, notification, and/or alert may be evaluated to determine whether the user of the mobile phone is or is likely to engage with the mobile device responsive to that event. For example, if a phone call is dismissed or otherwise not accepted by the user, the phone call may not be determined to be received at 416. In other examples, the phone call may be determined to be received at 416 responsive to detecting the incoming call and/or regardless of whether the user accepted the call.

If a phone call is not determined to be received (or any other suitable event is not determined to have occurred, e.g., "NO" at 416), the method proceeds to 417 to not transfer location information and call status (and not selectively adjust speaker output in some embodiments) and then returns to 412 to continue determining/monitoring the location of the mobile device. Although shown as a looped routine in FIG. 4 for illustrative purposes, it is to be understood that the routine may be configured as an interrupt-based method, whereby the location of the mobile computing device is determined/correlated responsive to the mobile computing device receiving new location data (e.g., moving into range of a new sensor) and the system waits until a phone call is received (or other suitable event occurs). If a phone call is received (or any other suitable event is determined to occur, e.g., "YES" at 416), the method proceeds to 418 to transfer the location information and call status from the mobile computing device to the head unit (e.g., to the in-vehicle computing system). In this way, the in-vehicle computing system may be informed of the most up-to-date location information at the time the call was received. Additionally, information such as the type of phone call or other event that occurred may be utilized to determine the status of the mobile computing device (e.g., whether the user is interacting with the mobile computing device, whether the interaction is likely to include audio, etc.).

At 420, method 400 includes selectively adjusting speaker output characteristics for each speaker based on the location of that speaker relative to the mobile computing device. For example, the in-vehicle computing device may only command a change in one or more audio settings for the speaker that is closest to the mobile computing device based on the location information received from the mobile computing device. In one example, the adjustment may include lowering the volume level for the speaker that is closest to the mobile computing device. Other examples of audio setting adjustments will be described below with respect to FIG. 6B.

Figure 5:
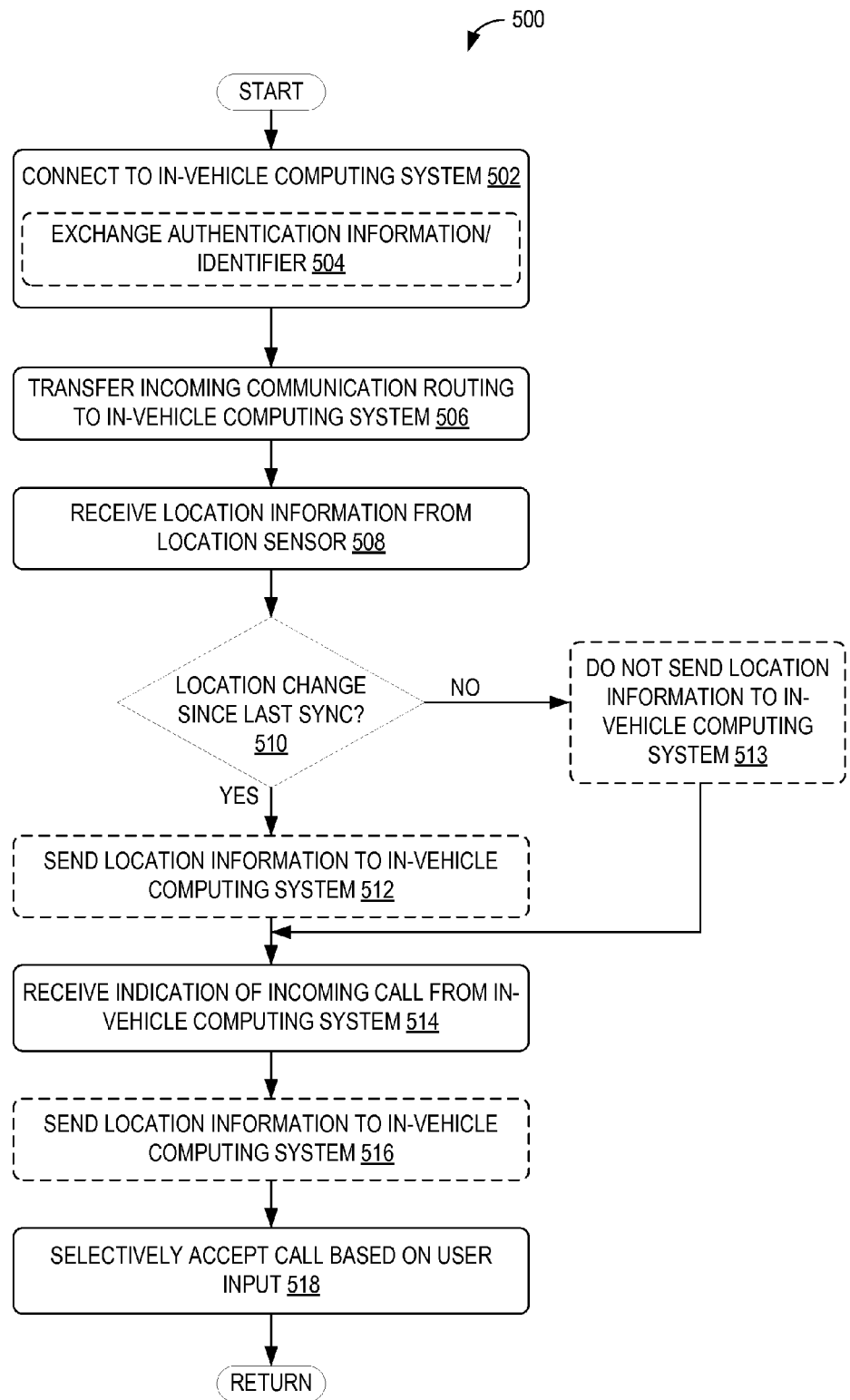
FIG. 5 is a flow chart for an example method for interacting with vehicular systems via a mobile computing device in accordance with one or more embodiments of the present disclosure.

FIG. 5 is a flow chart for an example method 500 for interacting with vehicular systems via a mobile computing device. For example, method 500 may be performed by mobile device 128 of FIG. 1, 206 of FIG. 2, and/or 342 of FIG. 3. Method 500 may be performed by one or more applications executed on the mobile device, such as application 344 of FIG. 3. At 502, method 500 includes connecting to an in-vehicle computing system. For example, the mobile computing device may exchange authentication information and/or send an identifier for the mobile computing device, as indicated at 504. At 506, method 500 includes transferring incoming communication routing to the in-vehicle computing system. The transference of incoming communication routing may allow incoming calls to the mobile computing device to be intercepted by the in-vehicle computing system and/or otherwise enable the in-vehicle computing system to be notified of incoming calls and/or other communications to the mobile computing device. In some examples, transferring incoming call routing to the in-vehicle computing system enables the in-vehicle computing system to selectively route or withhold calls to the mobile computing device. In additional or alternative examples, transferring incoming call routing to the in-vehicle computing system may only provide notifications to the in-vehicle computing system of incoming communications targeting the mobile computing device, such that the mobile computing device receives all incoming communication targeting the mobile computing device.

At 508, method 500 includes receiving location information from one or more location sensors. For example, the mobile computing device may receive location information and/or an identity of a location sensor responsive to coming within range of the sensor (e.g., via a location-dependent communication mechanism, such as NFC, ZIGBEE, etc.). At 510, the method may include determining if there is a location change since a last synchronization with the in-vehicle computing system. If there is a location change (e.g., "YES" at 510), the method may proceed to 512 to send the new location information to the in-vehicle computing system. If there is no location change (e.g., "NO" at 510), the method skips 512 (e.g., proceeds to 513 to not send location information to the in-vehicle computing system) and then proceeds to 514. In this way, the in-vehicle computing system may be kept up to date regarding any changes in location of the mobile computing device as such changes occur.

At 514, method 500 includes receiving an indication of an incoming call from the in-vehicle computing system. At 516, the method optionally includes sending location information to the in-vehicle computing system. For example, if the mobile computing device does not inform the in-vehicle computing system of changes to the location information (e.g., does not perform steps 510 and/or 512), the mobile computing device may instead wait to send the most up to date location information when the incoming call is received. At 518, method 500 includes selectively accepting the call based on user input. For example, the indication of the incoming call may include presenting selectable options for a user to select to accept the call, ignore the call, or perform some action (e.g., send an automated message to the caller, etc.) responsive to receiving the call.

Figure 6A:
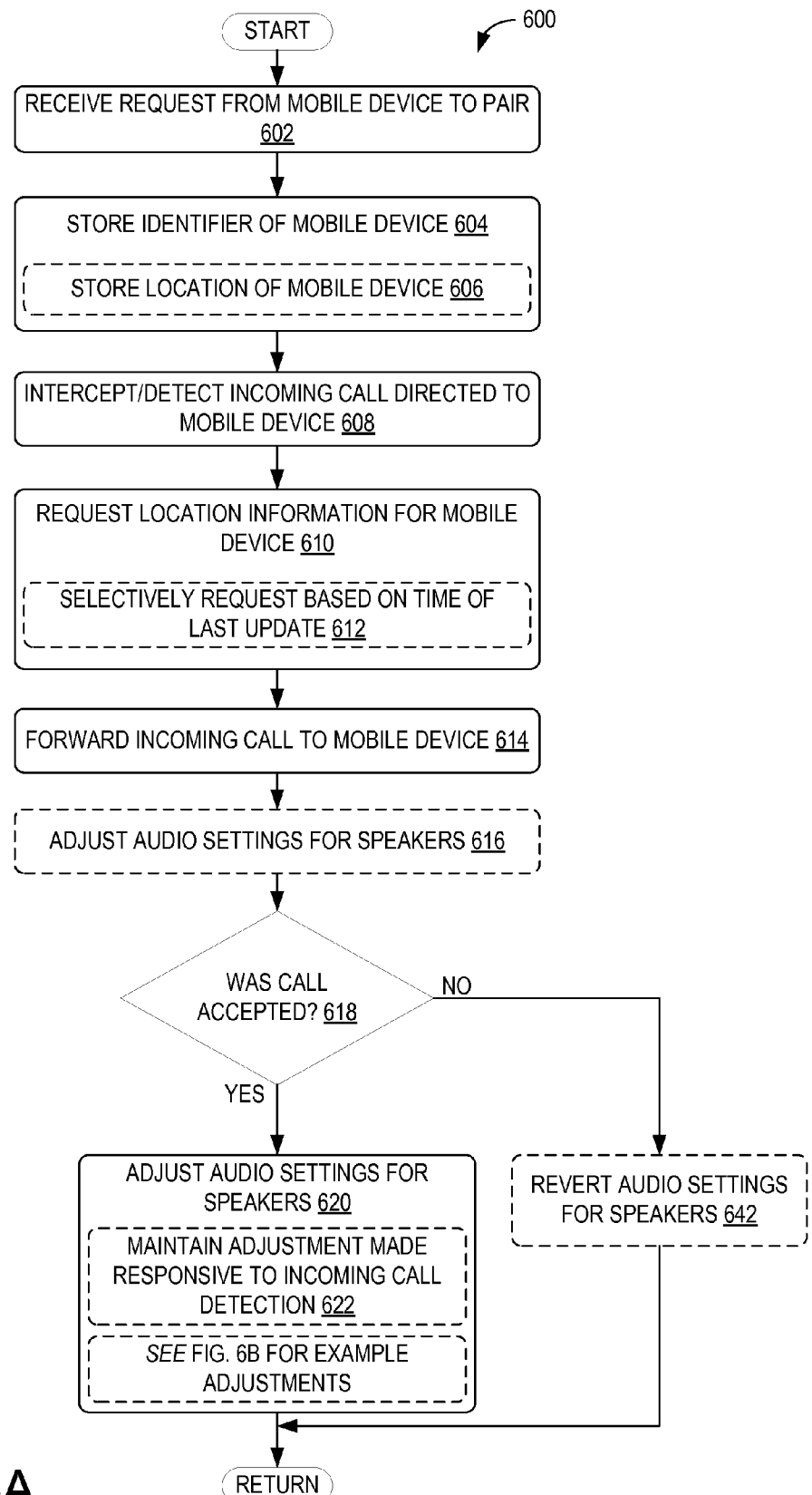
FIG. 6A is a flow chart for an example method of adjusting audio settings for speakers via an in-vehicle computing system in accordance with one or more embodiments of the present disclosure.

FIG. 6A is a flow chart of a method 600 for selectively adjusting audio settings for speakers via an in-vehicle computing system. For example, method 600 may be performed by in-vehicle computing system 109 of FIGS. 1 and 2 and/or in-vehicle computing system 300 of FIG. 3. At 602, method 600 includes receiving a request from a mobile device to pair with the in-vehicle computing device. For example, the in-vehicle computing system may receive authentication and/or identifying information from a mobile device, as described at 504 of method 500 in FIG. 5. At 604, the method includes storing an identifier of the mobile device at the in-vehicle computing system. As indicated at 606, the method may further include storing a location of the mobile device (e.g., location information provided to the mobile device by a location sensor, as described at 508 of method 500 in FIG. 5).

At 608, method 600 includes intercepting and/or detecting an incoming call directed to the mobile device. It is to be understood that the in-vehicle computing system may be paired with multiple mobile devices. In such an example, the in-vehicle computing system may determine that the incoming call is directed to the mobile device described throughout method 600 by matching addressing information in the incoming call to the identifier of the mobile device received/stored at 602/604. It is to be further understood that although examples described herein may refer to an "incoming call," the disclosure may also be directed toward responding to outgoing communications. For example, method 600 may additionally or alternatively (e.g., in the place of step 608) include detecting an outgoing call being made at the mobile device. At 610, the method includes requesting location information for the mobile device. As indicated at 612, the in-vehicle computing system may selectively request based on a time of the last location update. For example, if the difference between the current time and the last time that location information was received from the mobile device exceeds a threshold, the in-vehicle computing system may request the location information to ensure that an up-to-date location of the mobile device is determined. Otherwise, if the difference between the current time and the last time that location information was received from the mobile device does not exceed (or is equal to) the threshold, the in-vehicle computing system may not request the location information. In still other examples, the in-vehicle computing system may selectively request location information based on the configuration of the mobile device. For example, if the mobile device is configured to send location information as soon as the information changes, as described above with respect to steps 510 and 512 of method 500 in FIG. 5, the in-vehicle computing system may assume that the location information will be kept up to date and may not request location information responsive to intercepting/detecting the incoming call.

At 614, method 600 includes forwarding the incoming call to the mobile device. In some embodiments, the incoming call may be selectively forwarded based on the type of call/caller information, a context of the mobile device/user/vehicle, and/or other suitable factor. For example, if the mobile device is determined to be a driver's mobile device (e.g., based on proximity to the driver's seat, an identity of the mobile device that is tied to the driver, the determination that the driver is the only occupant in the vehicle, etc.) the incoming call may not be forwarded if the vehicle is traveling above a threshold speed or otherwise in a state in which driver distraction may result in unsafe operation of the vehicle.

Method 600 optionally includes adjusting audio settings for the speakers responsive to receiving/forwarding an incoming call to the mobile device (e.g., without determining whether the call was accepted), as indicated at 616. At 618, the method includes determining whether the call was accepted. If the call was accepted (e.g., based on user input, "YES" at 618), the method proceeds to 620 to adjust audio settings for one or more speakers (e.g., based on the location of the speakers relative to the location of the mobile device). For example, as indicated at 622, adjusting the audio settings may include maintaining the adjustment optionally made at 616 responsive to detecting/forwarding the incoming call. Alternatively, the adjustment made at 620 may be different than the adjustment made at 616.

Figure 6B:
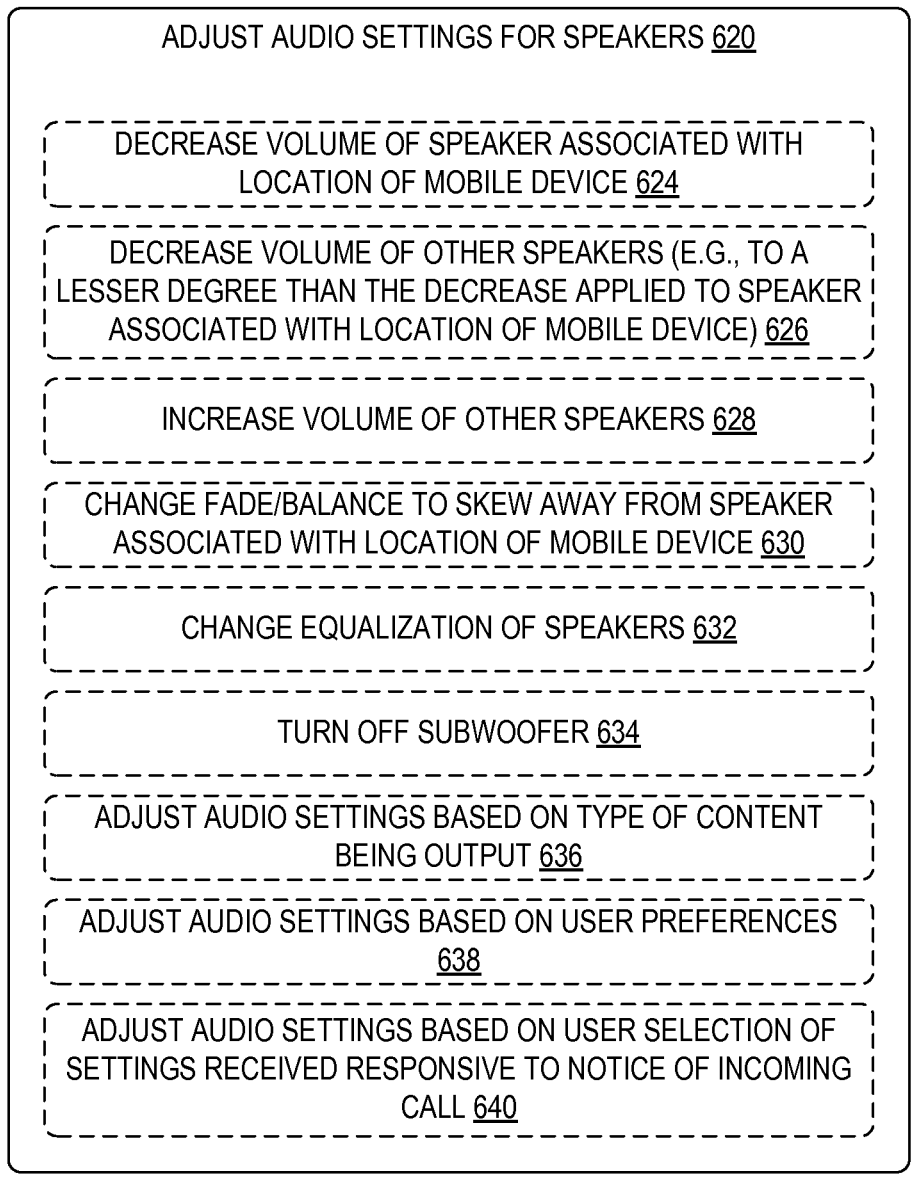
FIG. 6B shows example adjustments to audio settings in accordance with one or more embodiments of the present disclosure.

Turning briefly to FIG. 6B, example adjustments that may be made at 616 and/or 620 are shown. For example, the adjustment may include decreasing the volume of the speaker associated with the location of the mobile device (e.g., the speaker that is closest to and/or shares the same location information as the mobile device and/or location sensor that sent location information to the mobile device), as indicated at 624. The adjustment may additionally or alternatively include decreasing the volume of other speakers (e.g., the speakers that are not determined to be associated with/closest to the location of the mobile device), as indicated at 626. The decrease to these "other" speakers may be smaller than the decrease applied to the speaker associated with the location of the mobile device at 624 in some examples. As an example in which the speakers are adjustable to discrete volume levels (e.g., integer volume levels 1-10) and the initial speaker volume for all speakers is level 8, the speaker that is associated with the location of the mobile device may be decreased to level 3, while one or more of the remaining speakers may be decreased to level 5. In some examples, the other speakers may be decreased based on the location of each speaker relative to the mobile device. For example, using the speaker arrangement of FIG. 2, if the mobile device is located on the rear right side of the vehicle (e.g., closest to speaker 112c of FIG. 2), the speaker in that location may be lowered from volume level 8 to volume level 3, all other rear speakers (e.g., speaker 112d of FIG. 2) may be lowered from volume level 8 to volume level 5, and all other front speakers may be lowered from volume level 8 to volume level 7 (or maintained at volume level 8 in other examples). It is to be understood that the location-based tiers of adjustment may occur in a more radial fashion in other examples. For example, if the mobile device is located closest to the rear, right speaker (which is subsequently lowered from volume level 8 to volume level 3), the closest speakers to the rear right speaker (e.g., the rear left speaker 112*d* and the front right speaker 112*b* in FIG. 2) may be lowered from volume level 8 to volume level 5. Speakers that are farther away may be adjusted based on each speaker's total distance from the rear right speaker relative to the other remaining speakers (e.g., front left speaker 112*a* may be lowered from volume level 8 to volume level 7 or not lowered at all, as the total distance between the rear right speaker and the front left speaker is greater than the total distance between the rear right speaker and either the front right speaker or the rear left speaker). The type of volume adjustment may depend on the configuration of the vehicle/speakers in some embodiments. For example, vehicles in which row-to-row speaker isolation is greater than side-to-side speaker isolation may utilize the row-based speaker volume adjustment (e.g., adjusting rear speakers similarly, and adjusting front speakers similarly).

In additional or alternative examples, the volume of one or more other speakers (e.g., other than the speaker that is closest to the mobile device) may be increased, as indicated at 628. In this way, the volume decrease near the mobile device may be compensated for by increasing the volume of other speakers. For example, in the scenario described above in which the mobile device is closest to a right rear speaker (e.g., speaker 112*c* of FIG. 2), only the right rear speaker volume may be decreased from level 8 to level 3 and one or more of the remaining speakers may be increased from level 8 to level 10. It is to be understood that the example scenarios described above utilize values for illustrative purposes and any suitable degrees of adjustment may be made to any of the speakers.

In additional or alternative embodiments, the adjustment may include changing a fade and/or balance of the speaker arrangement to skew away from the speaker associated with the location of the mobile device, as indicated at 630. As indicated at 632, the adjustment may additionally or alternatively include changing an equalization of the speakers (e.g., changing a bass and/or treble setting and/or otherwise changing a frequency response of the speakers). The adjustment may additionally or alternatively include turning off a subwoofer, as indicated at 634. It is to be understood that any suitable combination of the adjustments described above may be performed at 620 in order to reduce distracting audio output for a user of a mobile device that is receiving an incoming communication.

The type of adjustment and/or the degree to which an audio setting(s) is adjusted may be based on one or more factors. For example, as indicated at 636, the method may include adjusting audio settings based on a type of content being output. For example, the in-vehicle computing system may determine a type of music (e.g., based on an identifier of a radio station and/or other audio source providing the music, or based on an analysis of the audio being output), whether the audio includes spoken word (e.g., a talk radio program and/or a voice call for another mobile device being played out over the speakers), etc. In some examples, music having a heavy bass line may be made less distracting by turning off a subwoofer, whereas spoken audio may not be altered a great deal by turning off the subwoofer. Accordingly, if the audio includes music featuring a heavy bass line, the adjustment may include turning off the subwoofer. As indicated at 638, the audio settings may be additionally or alternatively adjusted based on user preferences. For example, a user may define a default type and/or amount of adjustment responsive to incoming calls. The user-defined adjustments may be utilized for all incoming calls and/or may be defined for different contexts. For example, the adjustments described at 636 and 638 may be combined such that the user defines different types of adjustments for different types of content that may be output. After identifying the type of content being output (and responsive to detecting/forwarding an incoming call), the in-vehicle computing system may perform an audio setting adjustment based on the user preferences for that type of content. As indicated at 640, the audio settings may be adjusted based on user selection of settings received responsive to a notice of the incoming call at the mobile device. For example, the mobile device may present options to the user (e.g., presented via a graphical user interface displayed on a display of the mobile device) to allow the user to select a type of audio setting adjustment to perform responsive to receiving the incoming call. In this way, the user can control the type of audio adjustment dynamically as incoming calls arrive. The user may be presented with options regarding which type of adjustment to make, how much adjustment to make, which speakers should receive which type/amount of adjustment, etc. In some examples, a user may be given an option of one or more predefined profiles of adjustments, which may be defined by the in-vehicle computing system and/or defined at an earlier point in time by the user. The adjustment options presented to the user may alternatively only include an option to make an adjustment to the audio settings (e.g., which will be predefined and/or dynamically determined by the in-vehicle computing system) or to not make an adjustment to the audio settings.

Returning to FIG. 6A, if an incoming call is not accepted by the user (e.g., "NO" at 618), the method may optionally include reverting audio settings for the speakers, as indicated at 642, if the audio settings for the speakers were adjusted at 616 prior to determining whether the call was accepted. In this way, the adjustment at 616 may enable the user to have an opportunity to determine whether to accept or reject the incoming call in a reduced-distraction environment, and the audio settings may be reverted (e.g., to the respective states of each speaker immediately prior to 616) responsive to determining that the user did not accept the call (and therefore would no longer benefit from a reduced-distraction environment). It is to be understood that the reversion of audio settings may also be performed after determining that a call that was accepted at 618 was ended (e.g., after 620).

Figure 7:
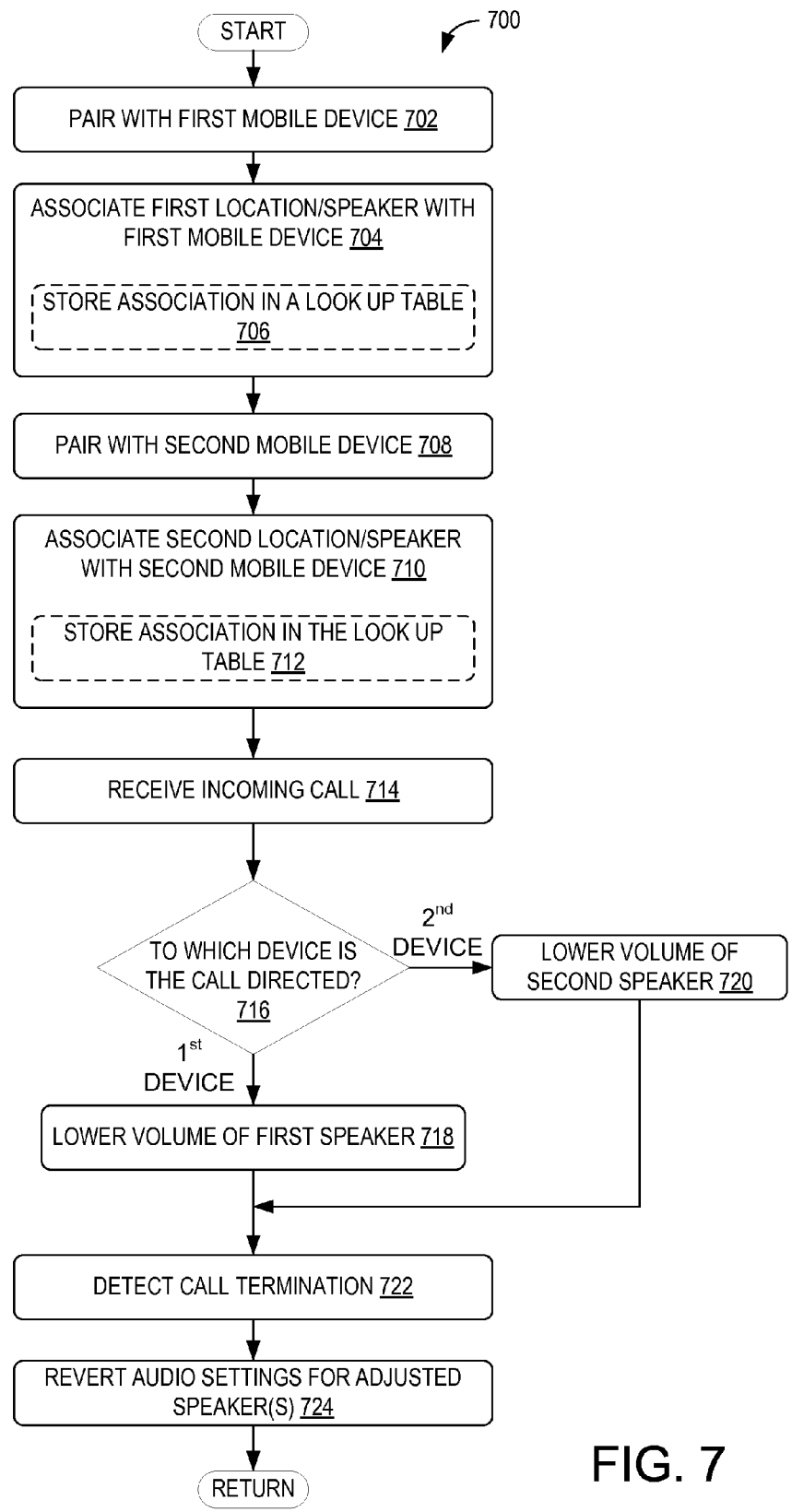
FIG. 7 is a flow chart of an example method for adjusting speakers in a vehicle based on incoming calls to different mobile devices in the vehicle.

FIG. 7 is a flow chart of an example method 700 for adjusting speakers in a vehicle based on incoming calls to different mobile devices in the vehicle. For example, method 700 may be performed by an in-vehicle computing system, such as in-vehicle computing system 109 of FIGS. 1 and 2 and/or in-vehicle computing system 300 of FIG. 3. At 702, method 700 includes pairing with a first mobile device. For example, upon entering a vehicle, the first mobile device may pair with the in-vehicle computing system by exchanging authentication information and/or identification information to enable further communication between the first mobile device and the in-vehicle computing system. Pairing with the first mobile device may also allow the in-vehicle computing system to provide hands-free operation (e.g., by routing audio from the first mobile device to the speakers of the vehicle) and/or to detect/intercept incoming calls or other communications/notifications to the first mobile device. At 704, method 700 includes associating a first location and/or speaker with the first mobile device. For example, the in-vehicle computing system may store the association in a look-up table or other mechanism for later retrieval, as indicated at 706.

At 708, method 700 includes pairing with a second mobile device. For example, the first mobile device may be a driver's mobile device, and the second mobile device may be a passenger's mobile device. Once the passenger enters the vehicle and/or powers up the second mobile device/ executes a selected application on the second mobile device, the in-vehicle computing system may exchange information with the second mobile device in order to perform the pairing operation. At 710, the method includes associating a second location and/or speaker with the second mobile device. As indicated at 712, the method may include storing the association regarding the second mobile device in the look-up table. Using the example above, in which the first mobile device is the driver's mobile device and the second mobile device is a passenger's mobile device, the first location may correspond to a driver's seat (and a speaker located closest to the driver's seat, such as a front left speaker) and the second location may correspond to a passenger seat (and a speaker located closest to the passenger seat, e.g., a front right speaker).

At 714, the method includes receiving and/or intercepting an incoming call. At 716, the method includes determining to which device the call is directed. For example, the in-vehicle computing system may analyze addressing information associated with the incoming call to determine which mobile device is identified as the recipient of the incoming call. If the call is directed to the first device (e.g., "1$^{st}$ DEVICE" at 716), the method proceeds to 718 to lower the volume of a first speaker (e.g., a speaker located at/closest to the first location, such as the front left speaker in the example described above). Otherwise, if the call is directed to the second device (e.g., "2$^{nd}$ DEVICE" at 716), the method proceeds to 720 to lower the volume of a second speaker (e.g., a speaker located at/closest to the second location, such as the front right speaker in the example described above). In this way, the volume adjustment is performed to the speaker that is closest to the mobile device receiving the incoming call, so that the audio in the vicinity of the user of that mobile device is adjusted to reduce distractions to the user. It is to be understood that other audio settings may be adjusted in addition to or as an alternative to the volume adjustments described at 718 and 720 in some examples.

As indicated at 722, method 700 may further include detecting a call termination (e.g., based on call status information received from the mobile device to which the incoming call of 714 was directed). For example, the call may be terminated when one or more of the user of the mobile device and the user of the device that initiated the incoming call hangs up or otherwise ends the communication between the devices. Responsive to detecting the call termination, the in-vehicle computing system may revert audio settings for the adjusted speaker(s), as indicated at 724.

As described above, one or more mobile devices may be present in a vehicle may receive incoming communications while audio is being presented in the vehicle. Adjusting audio settings of speakers in the vehicle based on the location of the speaker relative to a mobile device that receives an incoming call or other communication may ensure that the user of that mobile device is able to listen to the communication and/or respond with reduced disruption from the audio being played in the vehicle. Further, by targeting adjustments to the speaker(s) near the mobile device that is receiving an incoming communication, the other occupants of the vehicle may continue experiencing the audio presented by the speakers without being disrupted by the user of the mobile device.

The description of embodiments has been presented for purposes of illustration and description. Suitable modifications and variations to the embodiments may be performed in light of the above description or may be acquired from practicing the methods. For example, unless otherwise noted, one or more of the described methods and associated actions may be performed by a suitable device and/or combination of devices, such as the in-vehicle computing system 109 and/or mobile computing device 128 described with reference to FIGS. 1 and 2. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system for a vehicle, comprising:
   a processor;
   an external device interface communicatively coupleable to a mobile device; and
   a storage device storing instructions executable by the processor to:
      receive an indication of an incoming call directed toward the mobile device;
      determine location information for the mobile device;
      correlate the mobile device with a selected speaker of the vehicle, the selected speaker being associated with the location information for the mobile device;
      adjust, via the in-vehicle computing system, at least one audio setting for the selected speaker by a first amount responsive to receiving the indication of the incoming call; and
      adjust, via the in-vehicle computing system, the at least one audio setting for the selected speaker by a second amount responsive to detecting that the incoming call is accepted by a user.

2. The in-vehicle computing system of claim 1, wherein adjusting the at least one audio setting for the selected speaker by the first amount comprises decreasing a volume of the selected speaker from a first volume to a second volume.

3. The in-vehicle computing system of claim 2, further comprising decreasing a volume of one or more other speakers in the vehicle from the first volume to a third volume responsive to receiving the indication of the incoming call, the second volume being lower than the third volume.

4. The in-vehicle computing system of claim 3, further comprising detecting termination of the incoming call and reverting the volume of the selected speaker to the first volume and the volume of the one or more other speakers to the first volume.

5. The in-vehicle computing system of claim 1, wherein adjusting the at least one audio setting for the selected speaker by the first amount comprises changing an equalization of the selected speaker.

6. The in-vehicle computing system of claim 1, wherein adjusting the at least one audio setting for the selected speaker by the first amount comprises adjusting the at least one audio setting based on a type of content being output by the selected speaker.

7. The in-vehicle computing system of claim 1, further comprising receiving a user selection of audio settings after receiving the indication of the incoming call directed toward the mobile device, and wherein adjusting the at least one audio setting for the selected speaker by the first amount comprises adjusting the at least one audio setting based on the user selection.

8. The in-vehicle computing system of claim 1, wherein detecting that the incoming call is accepted by the user comprises determining that the incoming call is accepted at the mobile device.

9. The in-vehicle computing system of claim 2, wherein adjusting the at least one audio setting for the selected speaker by the second amount comprises decreasing the volume of the selected speaker from the second volume to a third volume, the third volume being lower than the second volume.

10. The in-vehicle computing system of claim 1, wherein determining the location information for the mobile device comprises receiving an identifier for a location sensor in the vehicle.

11. The in-vehicle computing system of claim 10, wherein correlating the mobile device with the selected speaker of the vehicle comprises matching the received identifier for the location sensor with stored location information for the selected speaker.

12. A method for selectively adjusting audio settings for speakers in a vehicle via an in-vehicle computing system, the method comprising:
outputting audio content via one or more speakers in the vehicle;
detecting, via communication received at one or more of an antenna and an external device interface of the in-vehicle computing system, a mobile device in the vehicle;
determining a location of the mobile device;
determining that an incoming communication is directed toward the mobile device; and
for more than one speaker in the vehicle, selectively adjusting one or more audio settings of that speaker in the vehicle based on a proximity of that speaker to the location of the mobile device, and a selected speaker in the vehicle being adjusted from an initial setting by a first amount responsive to the determination of the incoming communication and adjusted from the initial setting by a second, different amount responsive to detecting that the incoming communication is accepted at the mobile device.

13. The method of claim 12, wherein the mobile device is a first mobile device and the location of the mobile device is a first location of the first mobile device, the method further comprising:
detecting a second mobile device in the vehicle,
determining a second location of the second mobile device,
associating the first mobile device with a first speaker based on the first location, and
associating the second mobile device with a second speaker based on the second location.

14. The method of claim 13, further comprising, responsive to determining that the incoming communication is directed toward the first mobile device, adjusting one or more audio settings for the first speaker and responsive to determining that the incoming communication is directed toward the second mobile device, adjusting one or more audio settings for the second speaker.

15. The method of claim 14, wherein adjusting one or more audio settings for the first speaker comprises decreasing a volume of the first speaker and maintaining a volume of the second speaker.

* * * * *